Patented Aug. 21, 1951

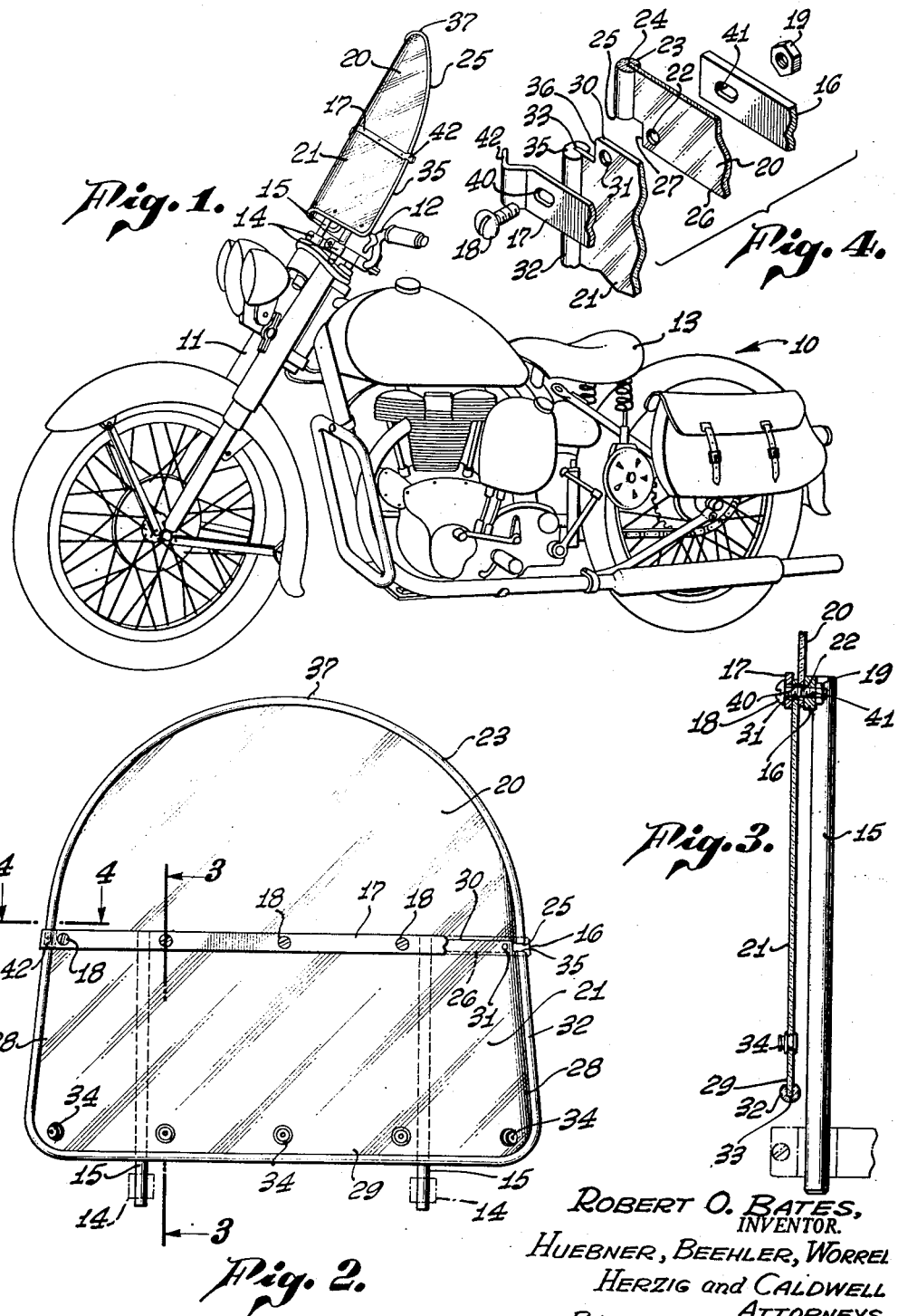

2,564,800

UNITED STATES PATENT OFFICE 2,564,800

WINDSHIELD

Robert O. Bates, South Gate, Calif.

Application September 18, 1948, Serial No. 49,906

5 Claims. (Cl. 296—78.1)

The application relates to windshields and particularly windshields of a flexible type which are commonly used on vehicles such as motorcycles, scooters, bicycles and the like.

On motorcycles, for example, as well as other vehicles of a generally similar class where the rider sits in the open, there is a definite need for some form of windshield or guard which serves the purpose normally of preventing too great a pressure of wind upon the rider, but also protects him from being struck by pebbles, gravel, dirt and dust which may be stirred up on a highway and be dangerous to the rider when the vehicle is traveling at high speed. It is highly undesirable to have a rigid windshield, shields of that type being particularly dangerous should the vehicle overturn. Heretofore a form of flexible windshield has been made use of to minimize the danger. There is, however, a danger even in flexible windshields which because of their relatively thin sharp edge tend to gouge and injure the rider in case of a spill, even though the windshield may not be broken. In flexible windshields, because of a constant and continuing flexure, there is a tendency to start cracks across the flexible material from the edges. Rigid rims at the edges, although providing a resistance to the starting of cracks, are undesirable because they also form a potential means of injuring the rider in the case of a spill.

It is therefore among the objects of the invention to provide a new and improved flexible windshield for open vehicles which is particularly safe and which at the same time is light in weight and easily mounted upon the vehicle.

Another object of the invention is to provide a new and improved flexible windshield, the flexible edges of which are specially constructed in order to preserve the shield against cracking and breaking in ordinary use.

Still another object of the invention is to provide a new and improved windshield for open vehicles which can be constructed in separate upper and lower halves either or both of which may be readily applied to a supporting frame or removed therefrom.

A further object of the invention is to provide a new and improved flexible windshield for open vehicles in which the edges are specially bound so as to improve the rigidity of the shield when in use while at the same time preserving a sufficient amount of flexibility in the event that the shield might be forced against the operator in case of a spill, and which moreover includes a special mounting means by virtue of which the windshield may be mounted upon and removed from a supporting frame, the structure thus making possible use of sheet material of lighter weight while at the same time providing a structure having sufficient strength for the purpose required.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a perspective view showing the assembled shield mounted upon a motorcycle.

Figure 2 is a front view of the shield with a portion of the mounting means partially broken away revealing the attachment of the shield to a supporting frame.

Figure 3 is a vertical sectional view of the shield and supporting frame taken on the line 3—3 of Figure 2.

Figure 4 is an exploded fragmentary sectional view taken along line 4—4 of Figure 2.

In the embodiment chosen to illustrate the invention the windshield forming the subject matter of the patent is illustrated as being mounted upon a motorcycle, the motorcycle being chosen as representative of the general type of open vehicles to which the device is best adapted. As illustrated particularly in Figure 1 the motorcycle 10 includes the usual forward fork structure 11 upon which are supported handle bars 12, these being in the usual position forward of a seat 13. Upon the handle bars may be provided brackets 14, one on each side, providing a means for mounting the windshield.

The windshield itself consists essentially of a frame having vertical columns 15, one on each side, these columns being adapted to be secured by the brackets 14. At the upper ends of the brackets is a horizontal support 16 which extends outwardly a substantial distance beyond both columns. Cooperable with the horizontal support is a strip 17 co-extensive with the support and adapted to be attached thereto by means of bolts 18 and nuts 19.

The embodiment shown consists of an upper section 20 and a lower section 21 both comprising relatively thin transparent plastic material. The material is somewhat flexible in that it can be bent when mechanical force is applied against it. The upper section has a rounded upper edge and a straight lower edge which overlies the horizontal support 16 and in which are provided holes 22 for reception of the bolts 18 by means of which the upper section is anchored by utilization of the strip 17 to the horizontal support.

Of particular importance is a bead 23 which surrounds the curved upper edge of the upper section. In the present embodiment the bead comprises a solid flexible band in which is provided a groove 24 adapted to snugly receive the curved edge of the flexible material comprising the upper section 20. It is necessary that the material be firmly held within the groove and this may be accomplished either by the use of a cementing medium or by softening and pressing the bead at the sides of the groove into intimate contact with the edge of the flexible section 20. As best illustrated in Figure 4 it will be noted that a free end 25 of the bead terminates a short distance above a bottom edge 26 of the upper section 20 and that an end 27 of the edge 26 is cut back or recessed a short distance inwardly.

The lower section 21, having a slightly different form in that it includes outwardly extending upright edges 28 and a horizontal lower edge 29, is nevertheless constructed in a manner similar to the upper section. The lower section has an upper straight edge 30 provided with holes 31 by means of which the upper edge is adapted to be secured to the horizontal support. The other edges 28 and 29 have mounted around their perimeters a bead 32 similar in form and substance to the bead 23. This bead also includes a groove 33 which is adapted to receive the edges 28 and 29 of the lower section which are there firmly held in place either by adhesive means, by heat treatment, or other appropriate means. Snap buttons 34 may be provided on the lower section for the attachment of a windbreak or shield for the lower portion of the vehicle.

It is further significant that the bead 32 terminates in a free end 35 at each side of the lower section which is spaced short of the location of the edge 30 and that the lower section adjacent the edge 30 has a cut back or recessed portion 36 corresponding to the form and shape of the upper section.

As has been previously described, the material forming the upper and lower sections 20 and 21 is relatively flexible. In order that such flexible material may be utilized to resist the pressure of wind it is advisable to bend it in an arc and thereby increase its rigidity. The arcuate shape of the sections is best discerned in Figure 1. In the upper section 20 particularly, because of the fact that there is no rigid support for the section above the horizontal support 16, a further expedient is resorted to in order to increase the resistance of the section to wind pressure. This lies in the giving of the upper section a curved upper edge so that there is in effect when the section is mounted a somewhat semi-circular form, the pinnacle of which lies at a point 37 and the base of which comprises the edge 26. To still further improve the rigidity of the upper section the bead 23 extends throughout the entire unsupported edge of the section above the horizontal support 16.

The lower section 21, not being given the somewhat semi-circular shape of the upper section, nevertheless has an arcuate form and is possessed of the bead 32 which improves the rigidity of the unsupported portion of the lower section. The lower section, however, is located in advance of the vertical supports 15 and is adapted to press against those supports when the pressure of the wind becomes sufficiently great.

When the sections are attached to the frame, the lower edges of one of the sections is applied first against the horizontal support 16. This may be the upper section 20 as illustrated in Figures 3 and 4. The lower section 21 may then be applied so that the edge 30 thereof overlies the edge 26 of the upper section, the sections thus being in overlapping relationship at the edge with holes 31 and 22 in alignment. To more greatly facilitate insertion of the bolt 18 the strip 17 may be provided with elongated slots 40 and the horizontal strip 16 provided with elongated slots 41. It will be understood, of course, that the strip 17 must be drawn to conform to the arcuate curve of the horizontal support 16.

It is also important to note that the recesses 27 and 36 and the foreshortening of the free ends 25 and 35 of the beads permit the free ends of the beads to be in endwise abutting alignment one with respect to the other when the upper and lower sections are mounted on the frame. The abutting relationship is readily apparent by inspection of the dotted lines at the left side of Figure 2.

The anchoring effect of the strip 17 against the horizontal support is utilized also for holding the free ends of the beads in proper relationship. To this end the strip is provided with a bent end portion 42 on each side adapted to receive the rounded contour of the free ends of the beads and when the bolt 18 is secured in place to firmly anchor the ends of the beads in their abutting relationship.

When the upper and lower sections are thus assembled upon the frame, because of the arcuate form of both sections and the somewhat triangular configuration of the upper section, the shield will have a certain amount of rigidity and resistance to the pressure of wind against it when used upon a vehicle traveling at a high rate of speed. Because of the fact that the material forming the beads is also flexible in nature there is permitted a certain limited flexure of the section and particularly of the rim of the section. Because of confining the rim of the flexible sheet material itself in a bead, the kind of whipping or flexing of the sheet material which ordinarily gives rise to the starting of cracks at the edge is prevented from the start of such cracks by the presence of the bead.

Under circumstances also where there might be a spill, and spills are almost inevitable in open type vehicles of the nature of motorcycles and motor scooters, should the rider fall against the edge of the shield, the rounded contour of the bead will prevent the edge from gouging the rider. Under such circumstances also the presence of the bead prevents the flexible section from being fractured and broken and thus protecting the rider from ragged, sharp edges. Further still, utilization of the bead at the edge which so effectively prevents breaking and so greatly increases the rigidity of the device in use is a factor permitting use of sheet material a great deal thinner in gauge than would be necessary if the sheet material alone were depended upon to supply the necessary rigidity.

The arcuate mounting for the shield moreover provides a highly resistant central support for the shield at a location where the presence of the horizontal support will not interfere with the vision of the operator when the device is in use. The arcuate form of the support which forces the edges of the sections and the strip to be drawn to it when the device is assembled and the overlapping relationship of the sections at the area of attachment adds decidedly to the strength and rigidity of the sections at this location. The structure thus described avoids the necessity of providing a bead also at the lower edge of the upper section and upper edge of the lower section. By provision of a special form for the strip at the ends, the free ends of the bead are held together in such a relationship that the effect is one of a continuous bead entirely around the outer perimeter of the entire windshield.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A flexible windshield for open vehicles comprising a metallic frame adapted for attachment to the vehicle including a horizontal support, an upper flexible transparent plastic member having a substantially straight edge adapted to engage the horizontal support and another edge of rounded shape standing free of any support, means for anchoring the straight edge to the support and a flexible bead extending around the other edge of the member, said bead having a groove therein receiving said other edge and a cementing medium adapted to fix said member in the groove.

2. A flexible windshield for open vehicles comprising a metallic frame adapted for attachment to the vehicle including a horizontal support, an upper flexible transparent plastic member having a lower substantially straight edge adapted to engage the horizontal support and a free curved upper edge, means for anchoring the lower edge to the support, and a rounded bead of solid flexible material extending around the other edge of the flexible member, said bead having a groove therein receiving said other edge and a cementing medium fixing said flexible member in the groove, and a lower flexible transparent plastic member having a substantially straight upper edge overlapping the lower edge of the upper member and releasably anchored to the horizontal support by said means, said lower member having a rounded bead of solid flexible material with a groove therein extending around the edge thereof other than the upper edge and a cementing medium fixing the lower member in the groove of said last identified bead.

3. A flexible windshield for open vehicles comprising a metallic frame adapted for attachment to a vehicle including a horizontal support, a flexible transparent plastic member having an edge thereof adapted to be secured to the support, an upwardly extending free rounded edge, a grooved bead for said rounded edge of said member and said rounded edge being adhesively secured therein, the ends of said bead being adjacent said first identified edge, and an anchor strip overlying the first identified edge in a position secured thereto, and to the ends of said bead and means adapted to releasably secure said anchor strip, said first identified edge and the ends of the bead to the horizontal support.

4. A flexible windshield for open vehicles comprising a frame adapted for attachment to a vehicle including a horizontal support, upper and lower flexible transparent plastic members having adjacent edges located at said support, a grooved bead for the remaining edge of each member and said remaining edge being adhesively secured therein, the ends of said beads on the respective members having a contiguous relationship at the ends of the adjacent edges, and an anchor strip applied to the edges and the ends of said beads and means adapted to releasably secure the anchor strip and edges to the horizontal support.

5. A flexible windshield for open vehicles comprising a frame adapted for attachment to a vehicle including a horizontal support, upper and lower flexible transparent plastic members having adjacent edges overlapping at said support, a grooved bead for the remaining edge of each member and said remaining edge being adhesively secured therein, ends of said beads on the respective members being foreshortened with respect to each other and having an abutting relationship at the ends of the overlapped edges, and an anchor strip overlying the overlapped edges and the abutting ends of said beads in secured relationship therewith and means adapted to releasably secure the anchor strip and overlapped edges to the horizontal support.

ROBERT O. BATES.

REFERENCES CITED

The following references are of record in the file of this patent:

UNITED STATES PATENTS

| Number | Name | Date |
| --- | --- | --- |
| 1,387,349 | Campbell | Aug. 9, 1921 |
| 1,532,008 | Walford | Mar. 31, 1925 |
| 2,237,594 | Dunlap | Apr. 8, 1941 |

FOREIGN PATENTS

| Number | Country | Date |
| --- | --- | --- |
| 531,137 | Great Britain | Dec. 30, 1940 |